P. J. FANNING.
AIR COMPRESSING BLOWER.
APPLICATION FILED NOV. 13, 1909.

983,813.

Patented Feb. 7, 1911.
2 SHEETS—SHEET 1.

WITNESSES
Benjamin L. Dennis.
Wallace C. Parsons

INVENTOR
Peter J. Fanning
per D. Scholfield
ATTORNEY

P. J. FANNING.
AIR COMPRESSING BLOWER.
APPLICATION FILED NOV. 13, 1909.

983,813.

Patented Feb. 7, 1911.
2 SHEETS—SHEET 2.

WITNESSES
Benjamin L. Dennis.
Wallace C. Parsons

INVENTOR
Peter J. Fanning
per J. Schofield.
ATTORNEY

UNITED STATES PATENT OFFICE.

PETER J. FANNING, OF PROVIDENCE, RHODE ISLAND.

AIR-COMPRESSING BLOWER.

983,813.  Specification of Letters Patent.  Patented Feb. 7, 1911.

Application filed November 13, 1909. Serial No. 527,936.

*To all whom it may concern:*

Be it known that I, PETER J. FANNING, a citizen of the United States, residing at Providence, in the State of Rhode Island, have invented a new and useful Improvement in Air-Compressing Blowers, of which the following is a specification.

My invention consists in the improved construction and arrangement of the driving mechanism, and in the improved arrangement of the compressed air chamber relatively to the diaphragm chamber.

Figure 1:
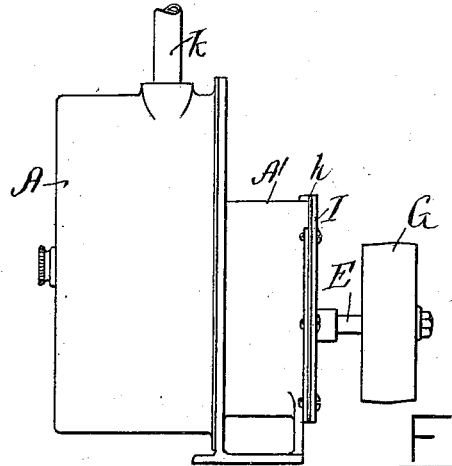
Figure 2:
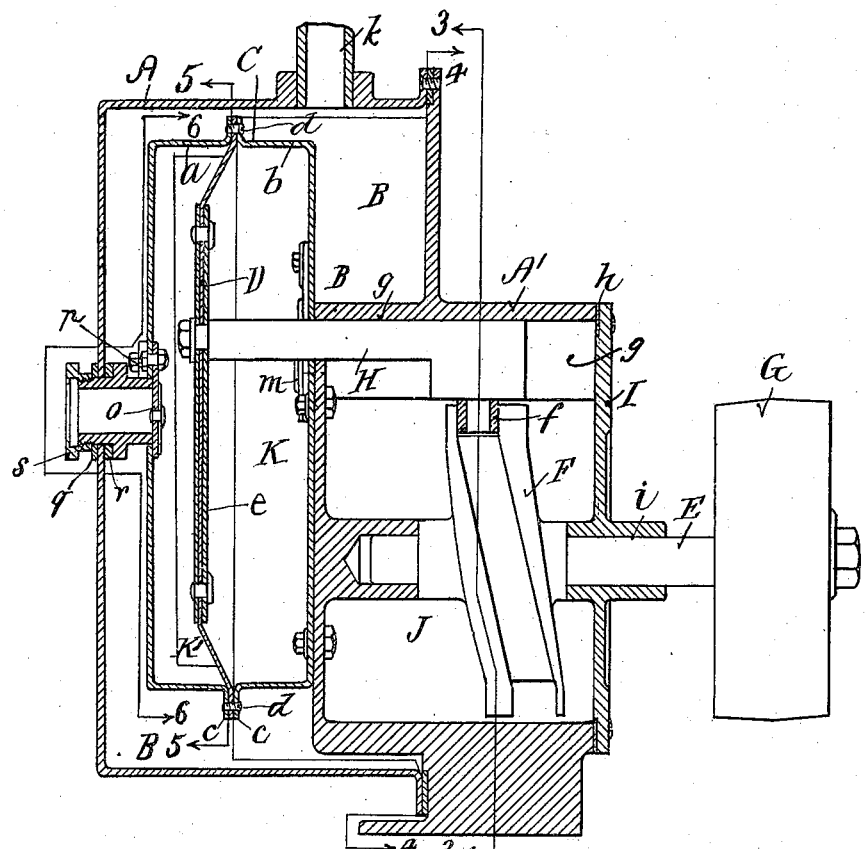
Figure 3:
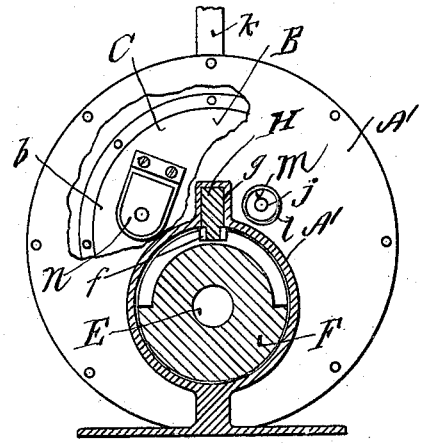
Figure 4:
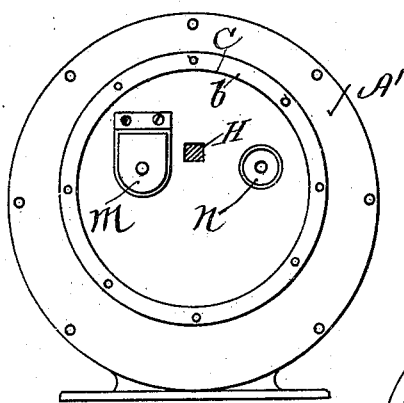
Figure 5:
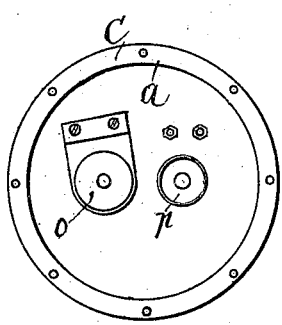
Figure 6:
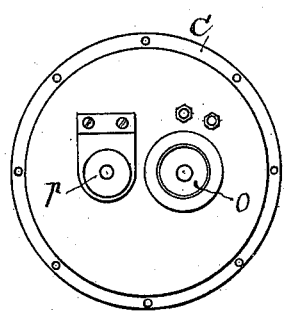

In the accompanying drawing: Figure 1 represents a side view of my improved air-compressing blower. Fig. 2 represents an enlarged vertical axial section of the same. Fig. 3 represents a section taken in the line 3, 3, of Fig. 2, on the scale of Fig. 1. Fig. 4 represents a section taken on the line 4, 4, of Fig. 2, on the scale of Fig. 1. Fig. 5 represents a similar section taken on the line 5, 5, of Fig. 2. Fig. 6 represents a similar section taken on the line 6, 6, of Fig. 2.

In the drawing, A represents the casing of the chamber B for the compressed air, and C, the casing of the air compressing diaphragm D, the said casing consisting of the two parts $a$ and $b$, which are connected with each other by means of the flanges $c$, $c$, and the screws $d$, $d$, and between the said flanges $c$, $c$, is clasped the boundary edge of the flexible diaphragm D, the central portion of the said diaphragm being clasped between the metallic disks $e$, $e$.

Upon the driving shaft E is secured the cam F, the said shaft and cam being driven by means of the pulley G. The sliding bar H serves to connect the cam F with the diaphragm D, the said bar being provided with the anti-friction roller $f$. The sliding bar D is made rectangular in its cross section and is held for movement in the slide way $g$, of the casing A', and the sliding bar G is so constructed, that the anti-friction roller $f$ will be about opposite to the center of the diaphragm D, as shown in Fig. 2, whereby the action of the machine will be properly balanced. The head I, of the casing A' is made removable, and provided with an air tight packing ring $h$, the said head being provided with the bearing $i$ for the outer end of the shaft E the lower portion of the air tight chamber J, so formed being adapted to hold oil for the continuous lubrication of the cam F, and by the employment of the practically air tight chamber J, stuffing boxes as heretofore employed in air compressing blowers are dispensed with, whereby a great saving in the power required for compressing the air is effected which is a feature of great importance.

The casing A' is provided with an inlet opening $j$ for air and the air which enters the same passes through the tube $l$ to the inlet flap valve $m$ of the air compressing chamber K, as shown in Fig. 4, the compressed air passing thence, upon the reversal of the movement of the diaphragm, out at the flap valve $n$ shown in Fig. 3 into the compressed air chamber B. And upon such reversal of the movement of the diaphragm air will be drawn into the chamber K' at the opposite side of the said diaphragm, through the flap valve $o$, and will be expelled into the compressed air chamber B, through the flap valve $p$, and from the chamber B the air escapes through the pipe $k$.

The joint between the outer casing A and the inner casing C, is made tight by means of the gaskets $q$ and $r$, and the thimble nut $s$.

I claim as my invention:—

1. In an air-compressing blower, the combination of a flexible diaphragm which divides the diaphragm chamber into two compartments, a driving cam held in a closed chamber, a partition between the chamber of the cam and a compartment of the diaphragm chamber, and an eccentrically arranged connection between the cam and the diaphragm, passing through the said partition.

2. In an air-compressor, the combination of a flexible diaphragm which divides the diaphragm chamber into two compartments, a driving cam held in a closed chamber, a partition between the chamber of the cam and a compartment of the diaphragm chamber, an eccentrically arranged connection between the cam and the diaphragm, passing through the said partition, and a chamber for the compressed air, surrounding the casing of a diaphragm chamber.

PETER J. FANNING.

Witnesses:
  SOCRATES SCHOLFIELD,
  BENJAMIN L. DENNIS.